INVENTORS
NICHOLAS J. PANZICA
EMIL UMBRICHT
BY ROBERT M. JAMISON
Curtis, Morris & Safford
ATTORNEYS

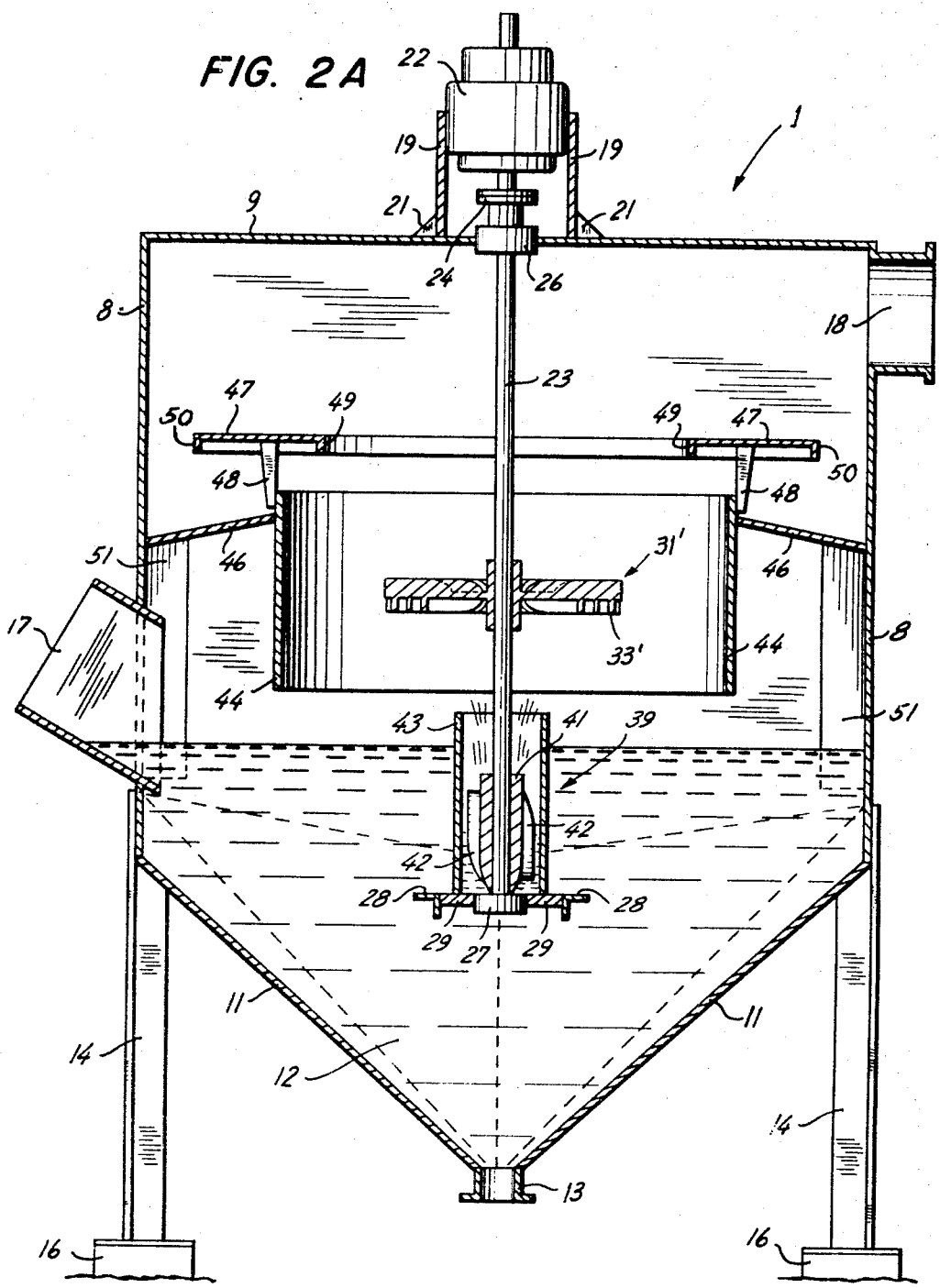

INVENTORS
NICHOLAS J. PANZICA
EMIL UMBRICHT
BY ROBERT M. JAMISON

Curtis, Morris & Safford
ATTORNEYS

United States Patent Office 3,444,669
Patented May 20, 1969

3,444,669
HIGH CAPACITY GAS WASHER
Nicholas J. Panzica and Robert M. Jamison, Detroit, and Emil Umbricht, Northville, Mich., assignors to Ajem Laboratories, Inc., Livonia, Mich.
Continuation of application Ser. No. 377,190, June 23, 1964. This application Feb. 3, 1967, Ser. No. 613,970
Int. Cl. B01d 47/08
U.S. Cl. 55—230                      5 Claims

ABSTRACT OF THE DISCLOSURE

Air pollution control gas washing apparatus for removing significantly greater percentages of pollutant than previously possible by comparable prior devices, said apparatus having separately contained washing, moisture elimination, and blower sections joined by elongated ducts and with said washing section incorporating a rotary spray means which hurls liquid droplets in a dense, high-velocity, spray pattern across the gaseous flow therethrough.

---

This is a continuation of application Ser. No. 377,190 filed June 23, 1964, now abandoned.

This invention relates to gas washers, and more particularly, to an improved type of device for cleasing impurities and contaminants from large volumes of industrial gases.

Public attention is being drawn more and more to the problem of atmospheric pollution. The dangers and hazards to human, animal and plant life presented by air pollution are increasing, particularly in urban, industrialized areas where the concentrations of population and manufacturing activities are both great and growing. Damage to and loss of property due to air pollution, directly or indirectly, are also being increasingly recognized. Civic organizations and governmental authorities at all levels are taking more interest in atmospheric pollution and are seeking ways to prevent or control and minimize it. Action is manifested in the form of statutes, ordinances, codes and regulations designed to strike at the heart of the pollution problem, i.e., at the major sources of pollution where contaminants are released to the atmosphere.

Illustrative of such sources existing in industrial situations are steel and other metal refining operations, chemical manufacturing and processing, petroleum refining, founding activities, and largescale painting functions. These and other industrial operations tending to pollute the surrounding atmosphere generally use large amounts of air or other gases for various purposes, for example, for combustion, reaction, cooling or ventilation. The gases commonly contain or acquire foreign materials in the form of solid or vaporous particles which are released to the atmosphere when the gases are exhausted from the particular operation.

Strides have been made toward purifying industrial gases prior to their release in order to prevent pollution. The steps often have been taken under the pressure of governmental enforcement. But it may be costly to buy and use appropriate equipment. Moreover, as the nation's commerce grows, the sources of pollution increase. Still more important is the recognition that contaminants of small sizes, in the ultra-fine range in the order of magnitude approaching molecular sizes, e.g., of about less than a micron, generally constitute a significant portion of the pollutants in the atmosphere. While currently available and used machines have reasonably good contaminant removal efficiencies, their ability to remove ultra-fine particles is not as good, especially as the over-all capacity of the washers increase. Increasingly stringent requirements on the level of contaminants, particularly of fines allowable in industrial gases vented to the atmosphere necessitate development of more efficient and effective devices and of machines able to wash greater quantities of such gases. The desirability of keeping the cost of such machines, including their operational costs, at reasonable levels is apparent. Cleansing larger quantities of gases and removing greater amounts of contaminants, both absolutely and relatively, from them are thus often necessary as well as desirable.

Accordingly, it is an object of this invention to provide an improved gas washer. Another object is to provide gas washers having a high efficiency for removing contaminants from gases. Still another object is to provide gas washers capable of cleansing large quantities of pollutants, especially ultra-fine particles, from gases at high levels of efficiency. A further object is the provision of a gas washer having a number of advantages, including greater capacity, versatility, ease of construction and assembly, and accessibility for servicing and upkeep, over previously known washers. These and other objects of the invention will in part be pointed out and in part obvious in the discussion hereinbelow.

One important and popular type of gas washer, described in Patent No. 2,599,202 to Schimpke and other patents to various of us and our co-workers, consists of a generally cylindrical housing through which gas or air to be washed and cleansed is passed. The gas is passed through a zone of spray droplets of a washing liquid within the housing which is generated by a rotary generator. A blower in the housing moves the gas. Pump means in the housing base feeds liquid for the spray to the generator. In the housing between the spray zone and the gas exhaust are baffles, set in horizontal tiers, commonly called "eliminators," for deposition and removal of liquid droplets caught in the gas flow.

Washers of that type have gas washing capacities of from several thousand to about thirty thousand standard cubic feet per minute; their size varies according to capacity from about four to ten feet in diameter, and they are generally about half again as high as their width. The generators within such washers have diameters of from about one foot to four feet and varying heights, usually greater or lesser than the diameter for small or large, respectively, diameter rotors. Rotational speeds of generators commonly range from less than to several thousand r.p.m. About one hundred to five hundred gallons per minute of liquid are circulated and generated into cleansing spray.

The invention can be better understood by reference to the accompanying drawings, depicting an embodiment of the invention wherein FIGURE 1 is a perspective view and shows a gas washer according to the present invention installed at the outlet end of a cupola furnace stack;

FIGURE 2A is a view similar to FIGURE 2 showing an alternate spray generating means;

Figure 1:
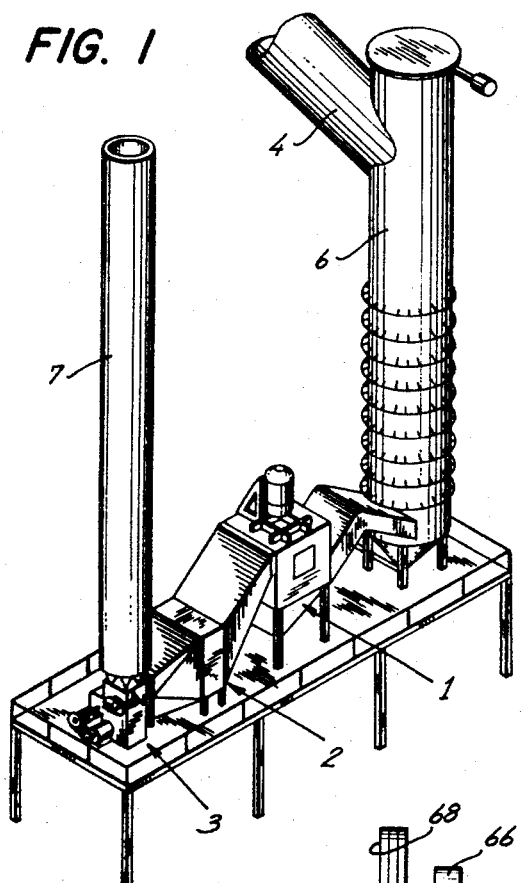

Referring to FIGURE 1, it will be seen that the washer shown therein comprises a washing section 1, an eliminator section 2 and a blower section 3. The washer is shown installed as part of a cupola gas furnace. Piping 4 from the coupola furnace stack enters into a downcomer 6 which has means for removing heat from the stack gases prior to the washing of the gases. The heat removed can be used for other purposes and contributes an economic saving. Heat removal is also advantageous since it has been found, in general, that the gas can be washed more effectively at lower temperatures. By cooling the gas, its volume can be reduced, thereby increasing the concentration of the contaminant particles in the gas which can be more efficiently washed. Above the fan section 3 of the washer is an exhaust stack 7 from which the washed gas is discharged.

Figure 2:
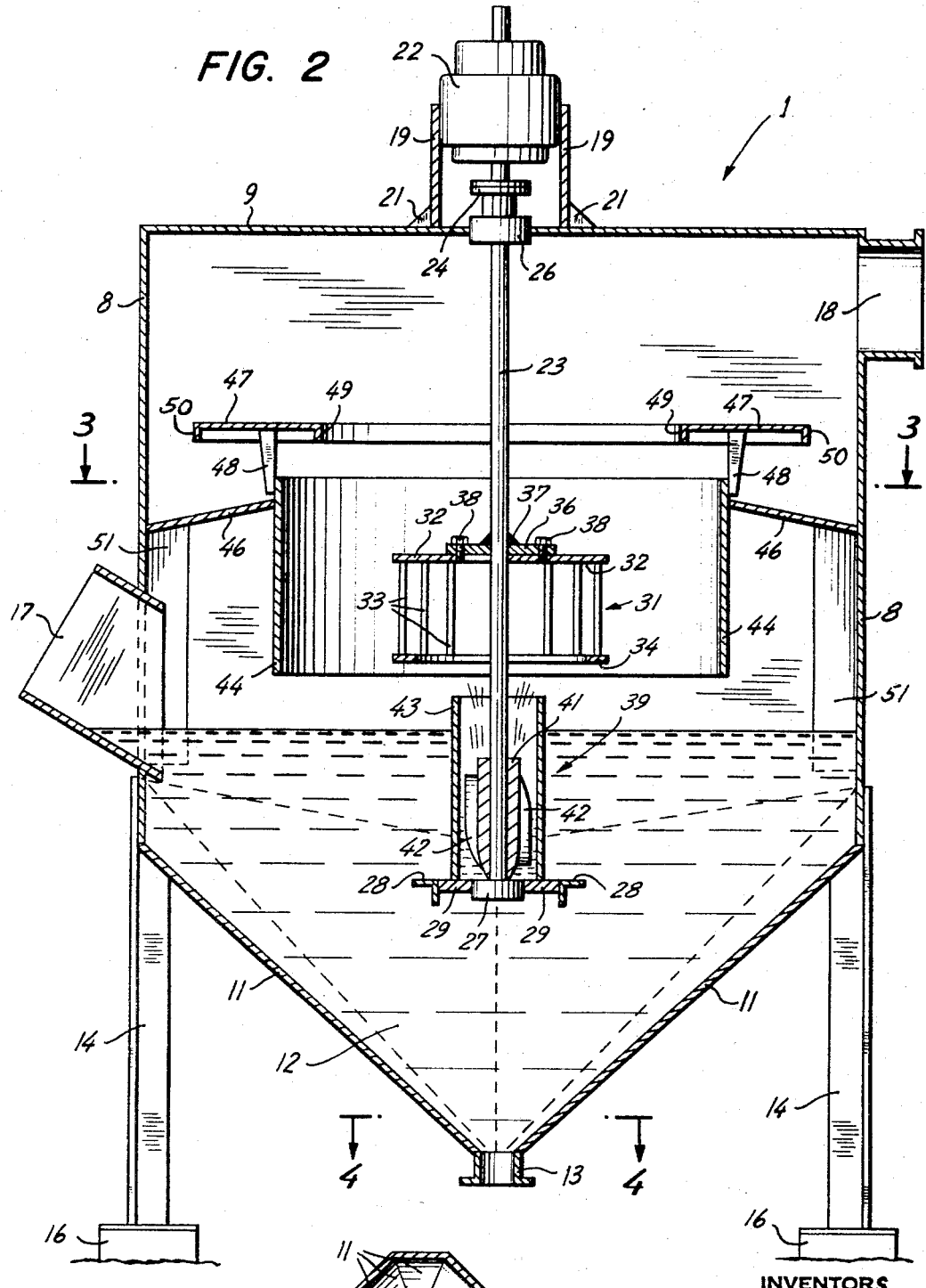
FIGURE 2 is a vertical axial section and shows the washing section of the washer.
Figure 4:
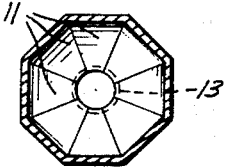
FIGURE 4 is a horizontal section taken along the lines 4—4 in FIGURE 2, and shows the conical base of the washing sections.

FIGURE 2 shows the washing section 1 of the gas washing device according to the invention. The washing section comprises a housing 8 having a top cover 9 and a conical base formed by a number of bottom plates 11. The conical bottom 11 forms a reservoir 12 for keeping a volume of liquid for washing the gas. Other shaped bases can be used, for example, the base can be a dished plate or it can be a flat plate. Moreover, the base can be a circular conical section as opposed to the octagonal conic section depicted, which can be seen in FIGURE 4. The base plates 11 at the apex of the cone are connected by a tubular conduit 13 which can be used for removing or recirculating the liquid in the reservoir 12, especially to remove contaminants therein to freshen the liquid prior to re-use.

The housing 8 can be supported by support means 14, embedded in bases 16, for example, in the ground.

At one side of the washer section 1 is a gas inlet 17. The inlet is preferably set at an angle of about 30° from the horizontal so that incoming gas impinges mildly on the liquid surface whereby some contaminant removal occurs. The gas is drawn into and through the washer section section 1 by the blower section 3. At a higher level is an outlet 18 through which washed gas is withdrawn from the washing section.

Mounted above the top housing plate 9 by support means 19 and 21 is a drive motor 22. The drive motor 22 is connected to a vertically disposed drive shaft 23 by means of a coupling 24. The centrally disposed drive shaft is supported in the housing top 9 by bearings 26 and its lower end by another set of bearings 27. The lower set of bearings is supported in the reservoir 12 portion of the washing section 1 by means of channel members 28 extending from the base plates 11 and brackets 29 between the channels 28.

About midway between the ends of the shaft 23 is a spray generating rotor 31 comprising a circular upper disk 32 and a plurality of bars 33 extending downwardly from the disk 32 and spaced around the periphery thereof. The lower end of the bars are stabilized by an annular ring 34. The generator 31 is supported on the shaft by means of a flange 36 secured to the shaft 23 and braced thereon by a fillet 37. The disk 32 of the generator 31 is screwed to the flange 36 by bolts 38. This method of assembly is preferred in that it permits easy assembly and disassembly of the generator 31 from the shaft. Other means of securing the rotor to the shaft, such as welding, can be used.

In place of the so called "squirrel cage" type rotor illustrated, a plurality of disks having vanes on their surfaces can be used. The bars 33 or the vanes, as the case may be, impact liquid fed to the generator 31, which rotates at high speeds, to spatter the liquid into droplets and hurl them out at high velocity as an intense spray. Gas passed through the spray is cleaned by the spray droplets.

A pump 39 associated with lower end of the shaft 23 feeds liquid from the reservoir 12 upwardly into the generator 31 where it is comminuted and driven out as the intense spray of droplets. The pump has a central hub 41 located around the lower portion of the shaft. On the hub are impeller screw blades 42 which drive liquid upwardly into the generator 31. Spaced around and close to the blades 42 is a guide collar 43 that confines the liquid on the blades to insure its being driven upwardly and also to guide the driven liquid into the generator 31 through the ring 34. The guide collar 43 is supported in the housing independently of the shaft on the cross brackets 29. Such pumping means are described in more detail in copending application Ser. No. 145,509 filed Oct. 16, 1961, now Patent No. 3,235,235.

Figure 9:
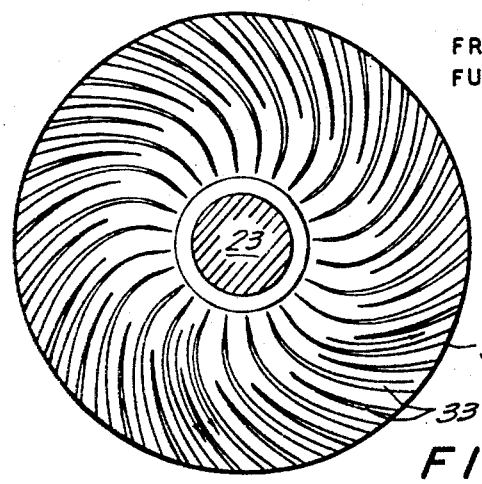
FIGURE 9 is a plan view of the spray generating means of FIGURE 2A.

It should be appreciated, in view of the disclosures in a number of our patents and patents of our co-workers, that the spray generator 31 can be driven independently of the pumping device 39. In such an embodiment, the drive shaft 23 of the rotor preferably is supported by two bearings in the vicinity of the top of the washing section 1. At the same time the pumping device 39 would have its intake in the reservoir 12 and its outlet at a position below the lower ring 34 of the generator 31 so that liquid is discharged from the pump directly into the rotor 31 or, if used, against vaned surfaces of a spray generating disk. As seen in FIGURES 2A and 9, the vaned impeller disc 31' mounted on drive shaft 23 includes projecting vanes 33' which are symmetrically and radially spaced. As disc 31' rotates the liquid fed by pump 39 impinges on the vanes 33' and, as explained above, the liquid is comminuted and driven outward as an intense spray of droplets. Copending application Ser. No. 80,822 filed Jan. 5, 1961, now Patent No. 3,168,596, shows both a separate feed system and vaned impeller disks.

It is of advantage to pass the gas to be washed through the spray zone as close to the rotating generator as possible since the spray droplets in that region are more concentrated; that is, there are more droplets per unit volume close to the generator than farther away from the generator. Another reason for the advantage is that washing efficiency, i.e., removal by the washing droplets of the contaminant particles, is in part based upon the speed of the liquid droplets, and the droplets have their highest speed close to the generator.

In order to confine the gas to be washed in the region close to the generator, a vertical annular baffle 44 is suspended in the housing surrounding the generator 31. The upper end of the baffle 44 preferably extends to an elevation above that of upper disk 32 of the rotor 31 while the lower end of the baffle 44 is preferably at an elevation below the lower ring 34 of the rotor, although it should be understood that the upper end can be below the upper disk 32 and the lower end can be above the ring 34. Thus, the main portion of liquid generated into spray by the rotor 31 is confined by the inner surface of the baffle 44 which surface defines a zone of the spray. Gas is prevented from by-passing around the baffle 44 by a generally horizontal shield 46. The shield also can be used as the support means for the baffle 44. As shown in FIGURE 2, the shield is slightly sloped, for reasons to be mentioned later, although it can be horizontal or even more steeply sloped.

Spaced above the annular baffle 44 is a satellite ring 47 which serves to deflect spray droplets which have been thrown up by the generator 31 or which have splashed from the interior surface of the baffle 44. Such droplets will deposit on the baffle 47, and thus be removed from the gas stream. Deposited droplets merge and accumulate on the ring 47 from which they drain off. The baffle 47 is supported by brackets 48 extending upwardly from the annular barrier 44. The inner and outer peripheries of the baffle 47 can have little lips 49 and 50 to aid in trapping and removing water droplets.

It will be appreciated that the region of the washer section 1 above the rotor will be wet, that is, a great deal of moisture will be carried into that region by the gas flowing through the washing section 1, and by splashing of the spray from various surfaces. A large portion of that liquid will be deposited on the baffle 47 and its lips 49 and 50. Other portions of the liquid will be deposited on the housing wall 8 and on the housing cover 9. Liquid on those surfaces will aggregate and fall. Thus, provision must be made for the return of the accumulated liquid to the reservoir 12 in the base of the washing section 1. That is accomplished by providing drain passages 52 in the corners of the housing 8. The plate 46 is cut away slightly in the corners and a vertical panel 51 extends downwardly from the plate 46 at the cut-away into the reservoir 12 below the level of the liquid therein. The drain 52 is formed by the panel 51 and two side walls 8 of the housing.

Figure 3:
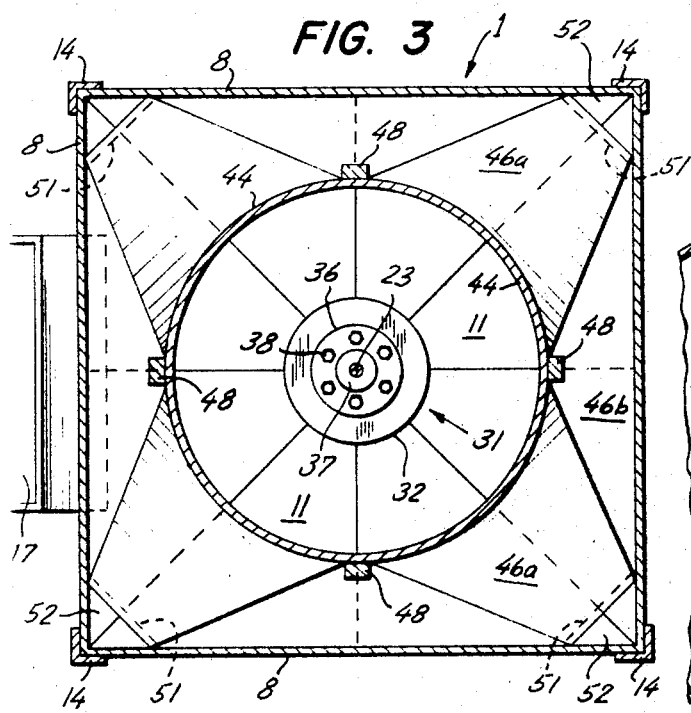
FIGURE 3 is a horizontal section taken along the line 3—3 of FIGURE 2 and shows the lower portion of the washing section.

In FIGURE 3, the horizontal sectional view of the washing section 1 shows the housing to be square, although it can be circular or of some other configuration. The inlet duct 17 is at one side of the housing 8. In the center of the housing is shown the shaft 23 and the flange 36 with the bolts 38 holding the upper disk 32 of the spray generator 31. Surrounding the generator 31 is the vertical annular baffle 44 bounding the spray zone. Projecting upwardly from the annular baffle 44 are the brackets 48 which hold the satellite ring 47 shown in FIGURE 2. Shown at the corners of the housing 8 are the support legs 14. The plate 46, spanning between the annular baffle 44 and the housing walls 8, can be seen in FIGURE 3 to be a plurality of plates each fashioned and set in such a way as to form a multifacetted surface. There are eight segments of the plate 46, four in the corner regions designated 46a and four along the side walls 8 referenced as 46b. The plate 46, as previously noted, could be a continuous conical surface or a flat plate. In the corners of the housing, and formed by the ends of the plates 46a, are the drain passages 52 formed by the housing walls 8 at their corners and the vertical panels 51 extending down into the reservoir 12 below. It will be appreciated that the slope of the plates 46 provide a surface from which spent spray liquid draining thereon will flow to the corners and through the drain passages 52 to the reservoir 12. Between the spray generator 31 and the annular baffle 44 can be seen the bottom plates 11 forming the base of the washing section 1.

Figure 5:
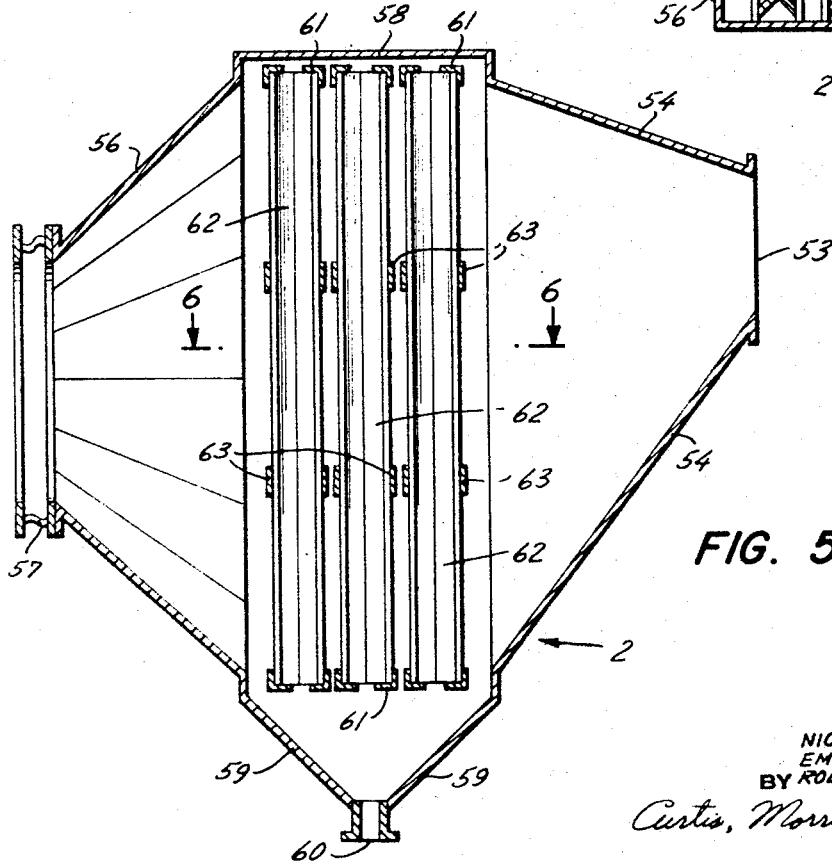
FIGURE 5 is a vertical section and shows the eliminator section of the washer.

FIGURE 5 shows the eliminator section 2 of the washer. An inlet 53 to the eliminator section 2 connects with the outlet 18 of the washing section 1. The inlet 53 communicates through a transition portion 54 to the main chamber of the eliminator section indicated by reference numerals 58 and 59. At the side of the eliminator section opposite the inlet 53 is a transition piece 56 leading to the outlet 57 from that section.

Figure 6:
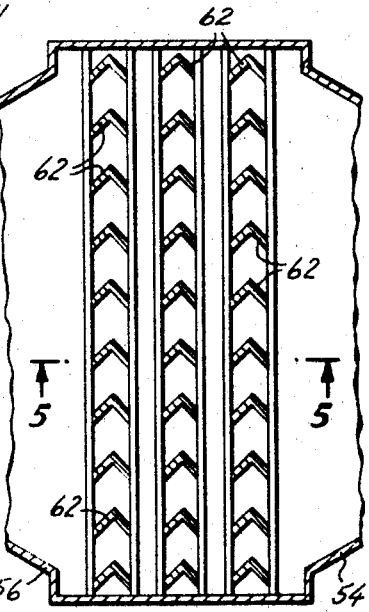
FIGURE 6 is a horizontal section taken along the line 6—6 of FIGURE 5 and shows the positioning of the eliminators within the eliminator section.

Within the eliminator section 2, and suspended by transverse bracket members 61, are the eliminator baffles 62. The eliminator baffles are a series of panels, preferably V-shaped, vertically disposed within the eliminator chamber. The disposition of the vertical baffles can be seen in FIGURE 6. The eliminators 62 form very tortuous passages through the eliminator section 2. Thus, as gas which has been washed in the washing section 1 passes through the eliminators, it will follow a zig-zag path between the baffles 62. Liquid droplets carrying contaminant particles entrained in the gas cannot negotiate the tortuous passages through the baffles 62 as readily as the gas itself, and will deposit on the surfaces of the eliminators 62. Droplets accumulating on the eliminators 62 merge and drain downwardly into the base of the eliminator chamber formed by the lower walls 59. Suitable drain means, for example, a tube 60 connected to a valve (not shown), serves to remove liquid collecting in the base. The eliminator baffles 62 are additionally braced by cross members 63 providing lateral support at points between their ends.

Figure 7:
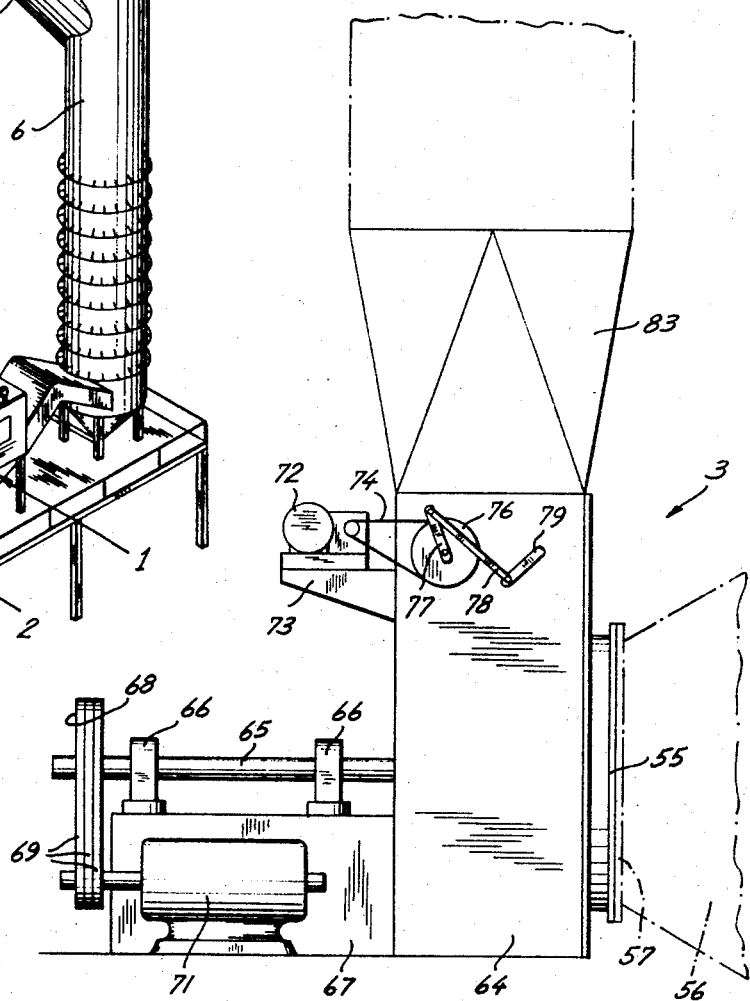
FIGURE 7 is an elevation and shows the blower and damper section of the washer.
Figure 8:
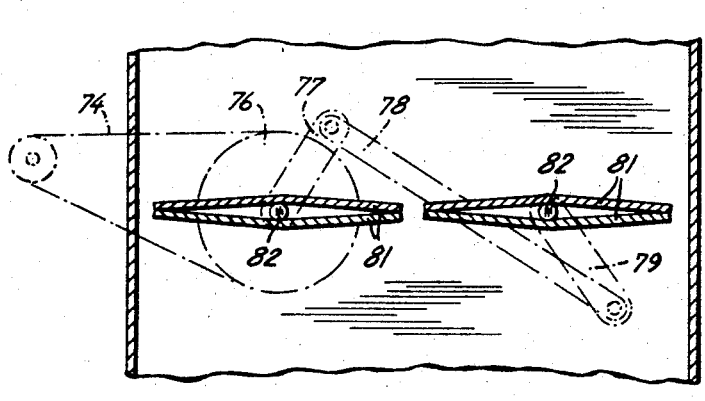
FIGURE 8 is a vertical section and shows a portion of the blower damper arrangement in the blower section shown in FIGURE 7.

The blower section 3 of the gas washer is shown in FIGURE 7. It comprises an inlet 55 connected to the outlet 57 and transition piece 56 of the eliminator section 2. The blower housing 64 surrounds a fan blower or other means for moving gas. The blower means are driven by a shaft 65 supported in bearings 66 mounted on a support base 67. At one end of the shaft 65 is a sheave 68 over which endless belts 69 make a drive connection with a motor 71 also mounted on the support base 67. The motor driven blower draws gas through the eliminator section 2 and through the washing section 1. The gas is discharged through a stack 7 as shown in FIGURE 1. Above the blower, in its discharge end, is a damper system. The damper system comprises a motor 72 mounted on a base 73 supported from the blower housing 64. The motor 72 drives a belt 74 around a pulley 76. Connected to the pulley 76 is a crank arm 77 connected by a linking arm 78 to another crank arm 79. FIGURE 8 shows the arrangement of the crank arms and the dampers 81. It will be noted that the dampers are a pair of flat plates 81 spaced on either side of and bent slightly around a shaft 82. There are two sets of these damper plates. According to the position of the drive motor 72, the crank arms 77 and 79, which are secured to the shafts 82, will adjust the dampers 81. The function of the damper system is to govern, in part, the volume and rate of gas drawn through the washing system.

Figure 10:
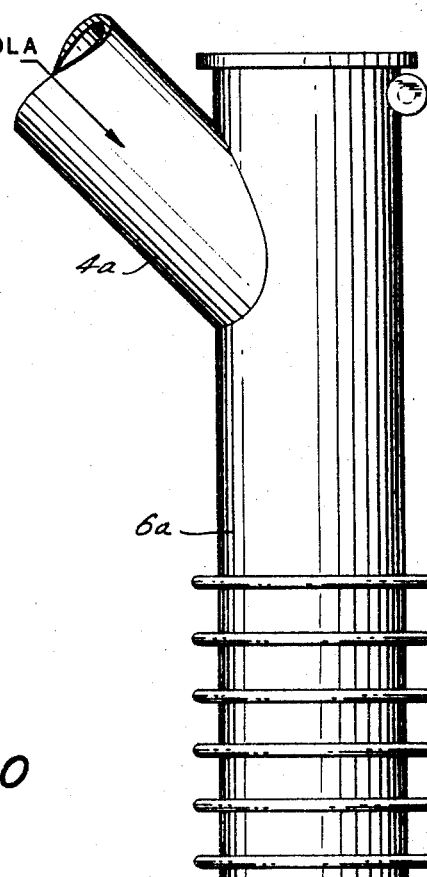
FIGURE 10 is an elevational view showing an alternate arrangement for the gas washer for the present invention.
Figure 10:
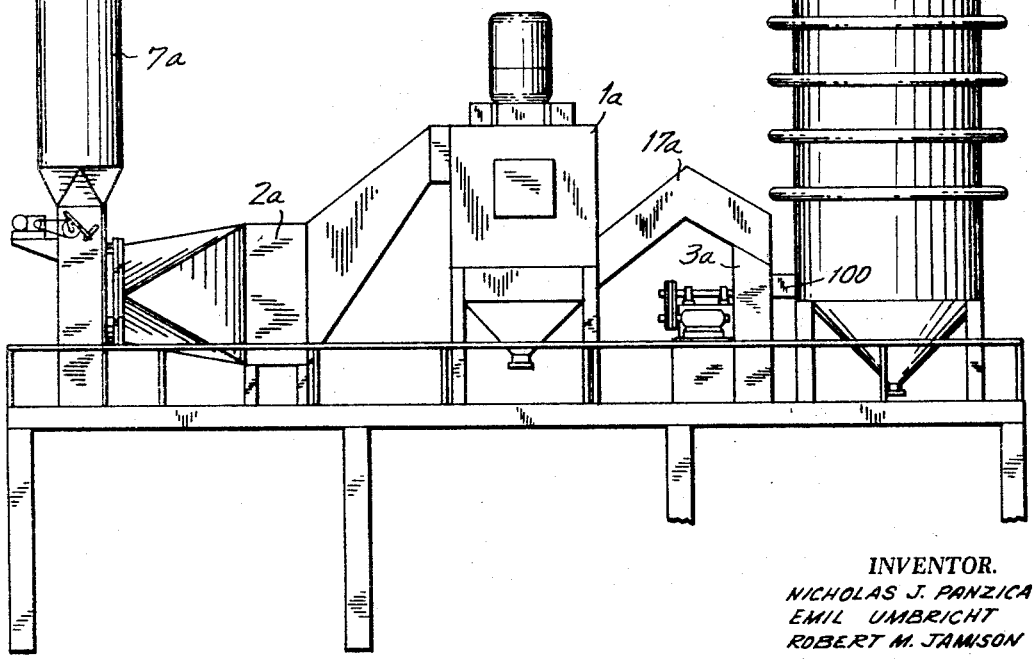

With reference now to FIGURE 10, there is shown an alternate arangement for the blower 3a which is positioned, in this arrangement, immediately after the gas exhaust from the downcomer 6a. Blower section 3a is similar to blower 3 but in this arrangement instead of sucking the gas through the washer section 1 and moisture eliminator 2, the blower pushes the air therethrough. The blower 3a functions in the same manner and like reference numerals with the designation "a" added relate to like parts which function in the same manner. Thus, it is seen that motor 71a drives endless belt 69a on drive sheave 68a which is mounted on the shaft 65a and supported in bearings 66a. Thus the gas is drawn through downcomer air exhaust 100 through the blower housing 3a and into the washer gas inlet 17a and the operation is the same as the operation described above.

A number of tests have been conducted to compare the efficiency of gas washers according to this invention with those previously known. One model, similar to the one depicted in the drawings, having a capacity for washing 40,000 standard cubic feet per minute of gas was compared to an older type gas washer having a 32,000 standard cubic foot per minute capacity. Since there is a difference in the gas capacities of the two washers, the test values set forth below are based on concentration terms and percentages for purposes of comparing the two machines.

A paint pigment of very fine aluminum silicate, designated ASP–100, approximately 49% of whose particles are less than ½ micron in size, was used in some tests. Using the older washer, and feeding an average of 962 grains of the ASP–100 pigment per thousand standard cubic feet of gas into the washer, resulted in removal of all but 6.83 grains per thousand standard cubic feet. The overall efficiency for that washer was about 99.3%. When using the washer according to this invention, and an inlet contaminant loading average of 842 grains per thousand standard cubic feet, the outlet loading concentration was found to be 2.47 grains per thousand standard cubic feet, an overall washing efficiency of 99.7%. While in relative terms the improvement may not appear significant, in absolute terms there is a remarkable increase in efficiency, since the contaminant is composed of ultra fine particles. Specifically, the reduction from 6.83 to 2.47 in the outlet loading represents a reduction of 63.8% in the amount of contaminants remaining in the outlet.

A second test using smaller concentrations of ASP–100 verified the results. The older washer reduced an inlet loading of 333 grains to 5.48 grains per 1000 standard cubic feet, an efficiency of 98.3%. However, the washer according to this invention, fed an average of 328 grains of ASP–100, removed all but 1.85 grains per 1000 standard cubic feet, an efficiency of 99.44%. Thus, the new washer reduced the outlet loading 66.2% compared to the older washer.

Tests were also made using welding smoke instead of the ASP–100 pigment. Welding smoke has been found to be extremely difficult to remove from air. With the older washer, 49.2% of the welding smoke contaminant was removed. By contrast, the washer of this invention removed 69.5% of the smoke, a substantial increase in the amount of welding smoke removed. That marked increase in removal ability particularly points out the improvement provided by the present washers since welding smoke is composed of extremely fine particles. Particularly it should be noted that in percent terms, the new washer reduced the amount of welding smoke by over 40% as compared to the old washer.

We claim:

1. A gas washing device comprising in combination: a washing section comprising a first housing enclosing said washing section and forming a spray washing zone, a first gas inlet and a first gas outlet in said housing and on opposite sides of said zone to permit the passage of contaminated gas to be washed through said spray washing zone intermediate said gas inlet and gas outlet, a first liquid reservoir connected with said housing providing a source of a gas washing liquid, a rotatable spray generating means within said housing for breaking up washing liquid fed thereto into droplets and accelerating and hurling said droplets across all portions of the gas flow through said zone as a dense spray pattern formed of high velocity liquid spray droplets whereby gas passing through said spray in said spray washing zone is washed by said droplets contacting and entrapping contaminant particles in said gas, means operatively associated with said spray generating means for rotating said spray generating means, liquid feed means connecting with said reservoir and said spray generating means for feeding washing liquid from said reservoir to said generating means for generation into the spray by said spray generating means:

said spray generating means having a rotatably mounted rotary disc with a plurality of symmetrically radially spaced impeller vane means projecting therefrom and said liquid feed means positioned to supply washing liquid substantially along the rotary axis of said disc and into said impeller vane means;

an eliminator section comprising a second housing enclosing said eliminator section separately from said washing section first housing and forming an eliminating zone for the removal of liquid particles entrained in gas washed in said washing section, and a collection chamber in the base of said second housing for accumulation of the removed liquid, a second gas inlet and a second gas outlet in said eliminator housing disposed with said eliminating zone between them whereby gas passing through said section passes through said zone, and a plurality of baffle means in and substantially filling said eliminating zone and forming a plurality of tortuous passages having extensive surfaces wherein liquid particles entrained in gas passing through said zone impinge upon and are deposited on said baffle means and are removed from said gas and drained into said collection chamber;

first elongated duct means of substantial length connected to and between said first gas outlet of said washing section and said second gas inlet of said eliminator section for the passage of washed gas from the former to the latter section;

a blower section comprising a third housing separate from said washing section first housing and said eliminator section second housing, a third gas inlet and a third gas outlet in said blower section third housing, and blower means within said blower section housing between said third gas inlet and said third gas outlet for drawing gas through said blower section from said third gas inlet to said third gas outlet; and second elongated duct means of substantial length connected to and between said blower section third gas inlet and said eliminator section housing second gas outlet whereby said blower means passes gas to be washed through said first housing, then through said second housing, then through said third housing.

2. A gas washing device as defined in claim 1 wherein said baffle means are V-shaped panels vertically disposed to provide a plurality of zig-zag passages for gas passing through said eliminator section.

3. A gas washing device comprising in combination:

a washing section comprising a first housing enclosing said washing section and forming a spray washing zone, a first gas inlet and a first gas outlet in said housing and on opposite sides of said zone to permit the passage of contaminated gas to be washed through said spray washing zone intermediate said gas inlet and said outlet, a first liquid reservoir connected with said housing providing a source of gas washing liquid, a rotatable spray generating means within said housing for breaking up washing liquid fed thereto into droplets and accelerating and hurling said droplets across all portions of the gas flow through said zone as a dense spray pattern formed of high velocity liquid spray droplets whereby gas passing through said spray in said spray washing zone is washed by said droplets contacting and entrapping contaminant particles in said gas, means operably associated with said spray generating means for rotating said spray generating means, liquid feed means connecting with said reservoir and said spray generating means for feeding washing liquid from said reservoir to said spray generating means for generation into the spray by said spray generating means;

said spray generating means having a rotatably mounted rotary disc with a plurality of symmetrically radially spaced impeller vane means projecting therefrom and said liquid feed means positioned to supply washing liquid substantially along the rotary axis of said disc and into said impeller vane means;

an eliminator section comprising a second housing enclosing said eliminator section separately from said washing section first housing and forming an eliminating zone for the removal of liquid particles entrained in gas washed in said washing section, and a collection chamber in the base of said second housing for accumulation of the removed liquid, a second gas inlet and a second gas outlet in said eliminator housing disposed with said eliminating zone between them whereby gas passing through said section passes through said zone, and a plurality of baffle means in and substantially filling said eliminating zone and forming a plurality of tortuous passages having extensive surfaces wherein liquid particles entrained in gas passing through said zone impinge upon and are deposited on said baffle means and are removed from said gas and drained into said collection chamber;

first elongated duct means of substantial length connected to and between said first gas outlet of said washing section and said second gas inlet of said eliminator section for the passage of washer gas from the former to the latter section;

a blower section comprising a third housing separate from said washing section first housing and said eliminator section second housing, a third gas inlet and a third gas outlet in said blower section third housing, and blower means within said blower section housing between said third gas inlet and said third gas outlet for drawing gas through said blower section from said third gas inlet to said third gas outlet; and second elongated duct means of substantial length connected to and between said blower section third gas outlet and said washing section housing first gas inlet whereby said blower means passes gas to be washed through said third housing, then through said first housing, then through said second housing.

4. A gas washing device according to claim 3 wherein said source of contaminated gas to be washed is a cupola furnace and said inlet of said blower section is connected to the stack of said furnace.

5. A gas washing device as defined in claim 3 wherein said baffle means are V-shaped panels vertically disposed to provide a plurality of zig-zag passages for gas passing through said eliminator section.

References Cited

UNITED STATES PATENTS

| | | | |
|---|---|---|---|
| 1,022,496 | 4/1912 | Muller et al. | 55—341 X |
| 1,728,130 | 9/1929 | Mathesius et al. | 55—126 X |
| 1,785,453 | 12/1930 | Morse et al. | 55—257 X |
| 1,896,020 | 1/1933 | Shimadzu. | |
| 2,472,101 | 6/1949 | Frisch | 55—443 X |
| 2,621,754 | 12/1952 | Doyle | 55—122 X |
| 2,675,090 | 4/1954 | Landgraf | 55—122 |
| 2,677,439 | 5/1954 | Hedberg. | |
| 2,717,657 | 9/1955 | Francis | 55—222 |
| 2,740,491 | 4/1956 | Vecchio | 55—257 X |
| 2,752,124 | 6/1956 | Nofziger | 261—29 X |
| 2,778,442 | 1/1957 | Jenkins et al. | 55—258 X |
| 2,889,005 | 6/1959 | Umbricht | 55—249 X |
| 2,940,733 | 6/1960 | Umbricht | 55—222 X |
| 2,964,304 | 12/1960 | Rice | 55—220 X |
| 3,167,413 | 1/1965 | Kiekens et al. | 55—257 X |
| 3,194,544 | 7/1965 | Jamison et al. | 261—29 X |

FOREIGN PATENTS

| | | |
|---|---|---|
| 551,684 | 6/1933 | Germany. |
| 561,508 | 10/1932 | Germany. |
| 23,024 | 1905 | Great Britain. |

HARRY B. THORNTON, *Primary Examiner.*

D. E. TALBERT, JR., *Assistant Examiner.*

U.S. Cl. X.R.

55—239, 249, 260, 267, 417, 443, 473; 261—28, 91; 266—15